United States Patent
Yu et al.

(10) Patent No.: US 11,824,466 B2
(45) Date of Patent: Nov. 21, 2023

(54) INSTANTANEOUS LINE SWELL PROTECTION FOR UPS

(71) Applicant: SCHNEIDER ELECTRIC IT CORPORATION, Foxboro, MA (US)

(72) Inventors: Qinghong Yu, Carlisle, MA (US); Camilo Mejia, Narragansett, RI (US); Daniel Santinho Lopes, North Smithfield, RI (US); Jeffrey M. August, Methuen, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 113 days.

(21) Appl. No.: 17/126,324

(22) Filed: Dec. 18, 2020

(65) Prior Publication Data
US 2022/0200483 A1 Jun. 23, 2022

(51) Int. Cl.
*H02M 7/797* (2006.01)
*H02M 1/32* (2007.01)
*H02M 1/42* (2007.01)

(52) U.S. Cl.
CPC ............ *H02M 7/797* (2013.01); *H02M 1/32* (2013.01); *H02M 1/4208* (2013.01)

(58) Field of Classification Search
CPC ...... H02M 7/797; H02M 1/32; H02M 1/4208; H02H 3/023; H02H 9/041; H02H 9/02; H02H 9/04; H02J 9/062
See application file for complete search history.

(56) References Cited

U.S. PATENT DOCUMENTS

| | | | |
|---|---|---|---|
| 7,772,716 B2 | 8/2010 | Shaver, II et al. | |
| 2007/0228834 A1 | 10/2007 | Hirahara | |
| 2009/0058086 A1* | 3/2009 | Arinaga | F03D 15/10 416/11 |
| 2009/0184583 A1* | 7/2009 | Lu | H02J 9/062 307/66 |
| 2012/0262129 A1* | 10/2012 | Lu | H02P 9/007 322/28 |
| 2018/0248364 A1* | 8/2018 | Shaver | H02J 3/381 |
| 2021/0288484 A1* | 9/2021 | Casey | H02H 9/06 |
| 2022/0139644 A1* | 5/2022 | Niehoff | H02H 3/087 200/42.01 |

FOREIGN PATENT DOCUMENTS

CN 202395439 U 8/2012

OTHER PUBLICATIONS

Extended European Search Report from corresponding European Application No. 21215330.8 dated May 31, 2022.

* cited by examiner

*Primary Examiner* — Shawki S Ismail
*Assistant Examiner* — Htet Z Kyaw
(74) *Attorney, Agent, or Firm* — Lando & Anastasi, LLP

(57) ABSTRACT

A power supply including an input configured to receive input power, an output configured to provide output power to a load, at least one relay, a crowbar circuit configured to selectively divert the input power away from the load, and a controller configured to detect a high-voltage condition at the input, activate, in response to detecting the high-voltage condition at the input, the crowbar circuit to divert the input power away from the load, output, in response to detecting the high-voltage condition at the input, a signal to operate the at least one relay to transition from a first state to a second state, and deactivate the crowbar circuit in response to a determination that the at least one relay has transitioned to the second state.

20 Claims, 8 Drawing Sheets

INSTANTANEOUS LINE SWELL PROTECTION FOR UPS

BACKGROUND

1. Field of Invention

The present disclosure relates generally to uninterruptible power supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include online UPS's, offline UPS's, line interactive UPS's, as well as others. Online UPS's provide conditioned AC power as well as backup AC power upon interruption of a primary source of AC power. Offline UPS's typically do not provide conditioning of input AC power, but do provide back-up AC power upon interruption of the primary AC power source. Line interactive UPS's are similar to offline UPS's in that they switch to battery power when a blackout occurs but also typically include a multi-tap transformer for regulating the output voltage provided by the UPS.

SUMMARY

At least one aspect of the present disclosure is directed to a power supply. The power supply including an input configured to receive input power, an output configured to provide output power to a load, at least one relay, a crowbar circuit configured to selectively divert the input power away from the load, and a controller configured to detect a high-voltage condition at the input, activate, in response to detecting the high-voltage condition at the input, the crowbar circuit to divert the input power away from the load, output, in response to detecting the high-voltage condition at the input, a signal to operate the at least one relay to transition from a first state to a second state, and deactivate the crowbar circuit in response to a determination that the at least one relay has transitioned to the second state.

In one embodiment, the controller is configured to provide, in response to deactivating the crowbar circuit, the output power to the load from the power supply. In some embodiments, the controller is configured to output the signal to operate the at least one relay to transition from the first state to the second state while simultaneously activating the crowbar circuit. In various embodiments, the controller is configured to determine that the high-voltage condition at the input has ended, and output, in response to determining that the high-voltage condition at the input has ended, a signal to transition the at least one relay from the second state to the first state. In certain embodiments, determining that the at least one relay has transitioned to the second state includes waiting for a predetermined amount of time to elapse after outputting the signal to operate the at least one relay to transition from the first state to the second state.

In some embodiments, the predetermined amount of time corresponds to a transition time of the at least one relay. In one embodiment, the at least one relay is coupled between the input and the output. In various embodiments, the power supply includes a power converter coupled between the input and the output, wherein the at least one relay is coupled between the input and the power converter. In certain embodiments, diverting the input power away from the load includes shunting at least a portion of a current associated with the high-voltage condition to a neutral connection.

Another aspect of the present disclosure is directed to an Uninterruptible Power Supply (UPS). The UPS includes an input configured to receive input AC power, an output configured to provide output AC power to a load, at least one relay, a crowbar circuit coupled to the input and configured to selectively divert the input AC power away from the load, and a controller configured to monitor the input AC power, operate, in response to a determination that the input AC power is acceptable, the UPS in a first mode of operation, detect a high-voltage condition at the input, activate, in response to the high-voltage condition at the input, the crowbar circuit to divert the input power away from the load, output, in response to the high-voltage condition at the input, a signal to operate the at least one relay to transition from a first state to a second state, and operate, in response to a determination that the at least one relay has transitioned to the second state, the UPS in a second mode of operation.

In one embodiment, the UPS includes a backup power input configured to receive backup DC power from a backup power source, and a converter configured to convert the input AC power from the input and the backup DC power from the backup power input into the output AC power. In some embodiments, the at least one relay includes at least one of an input relay configured to selectively couple the converter to the input and the backup power input, a bypass relay coupled between the input and the load, or a backfeed relay coupled between the neutral connection and the load. In various embodiments, the crowbar circuit is configured to divert the input power away from the load by coupling the input to a neutral connection for a duration equal to or greater than a transition time of the at least one relay. In certain embodiments, at least a portion of a current associated with the high-voltage condition is shunted to the neutral connection while the crowbar circuit is activated.

In some embodiments, the controller is configured to deactivate the crowbar circuit in response to a determination that the at least one relay has transitioned to the second state. In one embodiment, the first mode of operation corresponds to one of a bypass mode of operation or a line mode of operation and the second mode of operation corresponds to a backup mode of operation.

Another aspect of the present disclosure is directed to a non-transitory computer-readable medium storing thereon sequences of computer-executable instructions for controlling a power supply including an input configured to receive input power and an output configured to provide output power to a load. The sequences of computer-executable instructions include instructions that instruct at least one processor to detect a high-voltage condition at the input, activate, in response to detecting the high-voltage condition at the input, a crowbar circuit to divert the input power away from the load, output, in response to detecting the high-voltage condition at the input, a signal to operate at least one relay to transition from a first state to a second state, and deactivate the crowbar circuit in response to a determination that the at least one relay has transitioned to the second state.

In one embodiment, the sequences of instructions include instructions that instruct the at least one processor to output the signal to operate the at least one relay to transition from the first state to the second state while simultaneously activating the crowbar circuit. In some embodiments, the sequences of instructions include instructions that instruct the at least one processor to determine that the high-voltage condition at the input has ended, and output, in response to determining that the high-voltage condition at the input has ended, a signal to transition the at least one relay from the second state to the first state. In various embodiments, the sequences of instructions include instructions that instruct the at least one processor to determine that the at least one relay has transitioned to the second state by waiting for a predetermined amount of time to elapse after outputting the signal to operate the at least one relay to transition from the first state to the second state. In certain embodiments, the predetermined amount of time corresponds to a transition time of the at least one relay.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), may be used to provide regulated, uninterrupted power to sensitive and/or critical loads. An online UPS rectifies input AC power provided by an electric utility using a Power Factor Correction converter circuit (PFC) to provide DC power to at least one DC bus. The rectified DC power on the DC bus(es) may be used to charge a battery while mains power is available. In the absence of mains power, the battery discharges and provides DC power to the DC bus(es). From the DC power on the DC bus(es), an inverter generates an AC output voltage that is provided to a load. Since power is provided to the DC bus(es) from either mains or the battery, the output power of the UPS is uninterrupted if the mains fails and the battery is sufficiently charged. Online UPS's may also operate in a bypass mode where unconditioned power with basic protection is provided directly from an AC power source to a load via a bypass line.

Figure 1:
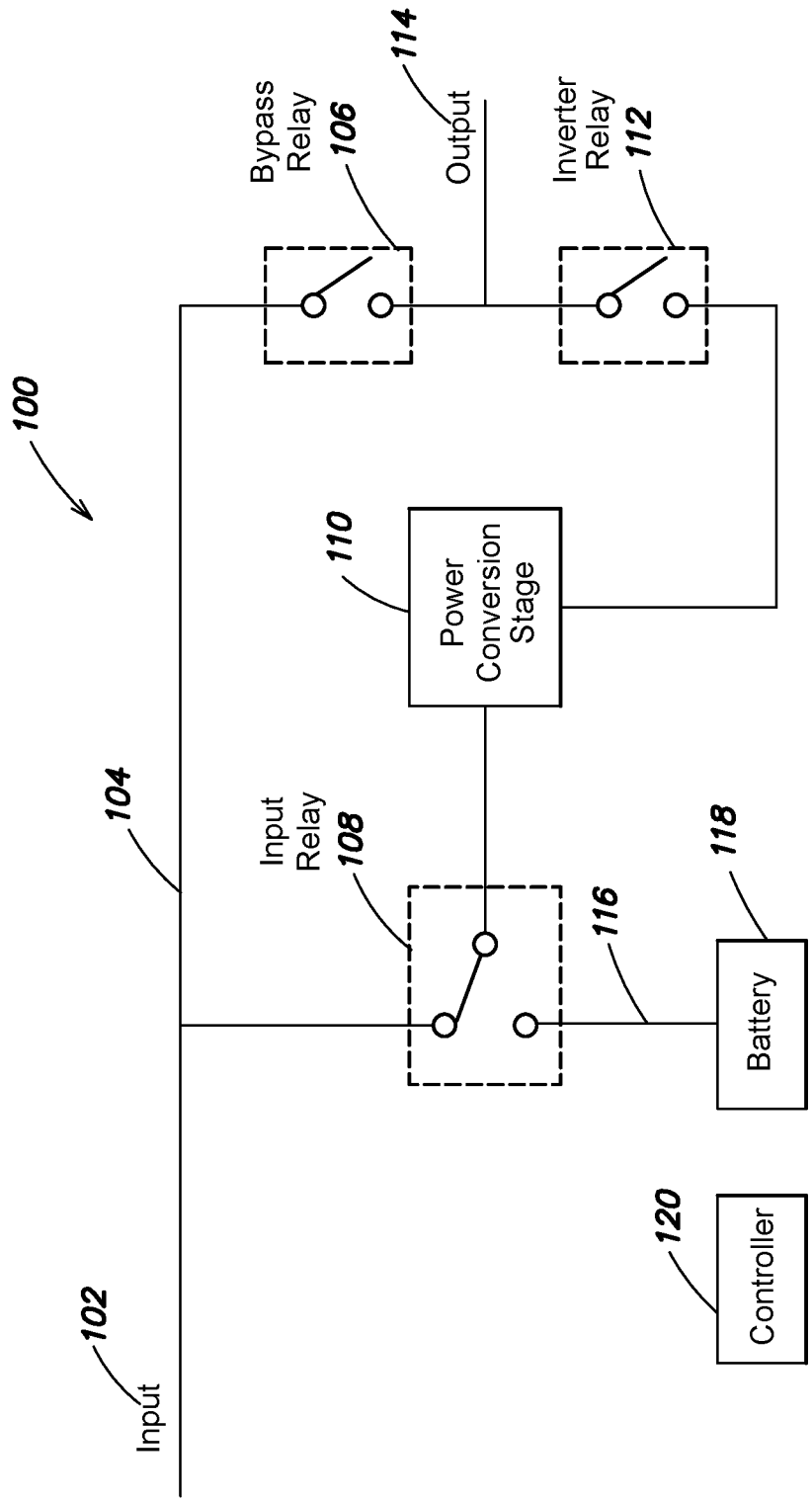
FIG. 1 is a functional block diagram of a UPS in accordance with aspects described herein.

FIG. 1 is a block diagram of one embodiment of an online UPS 100. The UPS 100 includes an input 102, a bypass line 104, a bypass relay 106, an input relay 108, a power conversion stage 110, an inverter relay 112, an output 114, and a backup power input 116. In one example, the backup power input 116 is configured to receive backup DC power from a battery 118. In some examples, the UPS 100 includes the battery 118; however, in other examples the battery 118 may be external to the UPS 100.

In addition, a controller 120 may be included in the UPS 100. In one example, the controller 120 is coupled to and configured to operate the bypass relay 106, the input relay 108, the power conversion stage 110, and the inverter relay 112. In certain examples, the controller 120 is external to the UPS 100. In some examples, the controller 120 includes one or more general computing processors, specialized processors, or microcontrollers. The controller 120 may include specially-programmed, special-purpose hardware, for example, an application-specific integrated circuit (ASIC), or more generally designed hardware, such as a field programmable gate array (FPGA), or a general purpose processor. In some embodiments, the controller 120 may be connected to one or more memory devices, such as a disk drive, memory, flash memory, embedded or on-chip memory, or other device for storing data. In some embodiments, the controller 120 may be one or more controllers including one or more components such as one or more processors.

As shown, the input 102 is coupled to the bypass line 104 and the input relay 108. The bypass relay 106 is coupled between the bypass line 104 and the output 114. The input relay 108 is coupled to the input 102, the power conversion stage 110, and the backup power input 116. The power conversion stage 110 is coupled to the input relay 108 and the inverter relay 112. The inverter relay 112 is coupled between the power conversion stage 110 and the output 114.

The UPS 100 is generally configured to operate in one of at least three modes of operation, including a bypass mode, a line mode, and a backup mode. The mode of operation of the UPS 100 is dependent upon a quality level of AC power received at the input 102. For example, when the AC power received at the input 102 is available and acceptable (i.e., within a specified range of acceptable electrical parameters), the UPS 100 may be configured to operate in the bypass mode. Likewise, when the AC power received at the input 102 is available but unacceptable (i.e., not within a specified range of acceptable electrical parameters), the UPS 100 may be configured to operate in the line mode. When AC power at the input 102 is unavailable (e.g., blackout, grid failure, etc.), the UPS 100 may be configured to operate in the backup mode. In some examples, the controller 120 is coupled to the input 102 and configured to monitor the input 102 to determine whether to operate the UPS in the bypass, line, or backup mode of operation.

In the bypass mode, the bypass relay 106 is turned on (i.e., closed) to connect the input 102 to the output 114. The input 102 receives AC power from an external source (for example, from a utility mains AC power supply) and provides the received power to the output 114. The output 114 receives the power from the input 102 and provides the power to an external load (not shown). In the bypass mode, the inverter relay 112 may be turned off (i.e., opened) to decouple the power conversion stage 110 from the output 114.

In the line mode, the bypass relay 106 is turned off (i.e., opened), and the input AC power is not provided to the output 114. The input relay 108 is controlled to couple the input 102 to the power conversion stage 110 and the inverter relay 112 is turned on (i.e., closed) to couple the power conversion stage 110 to the output 114. The power conversion stage 110 converts the input AC power into output AC power and provides the output AC power to the output 114. In one example, the power conversion stage 110 includes a PFC converter, an inverter, and at least one DC bus coupled between the PFC converter and the inverter. In some examples, the PFC converter is configured to convert the input AC power into DC power and the inverter is configured to convert the DC power into the output AC power.

In the backup mode, the bypass relay 106 is turned off (i.e., opened), the inverter relay 112 is turned on (i.e., closed), and the input relay 108 is controlled to couple the backup power input to the power conversion stage 110. In one example, the power conversion stage 110 is configured to convert the backup DC power received at the backup power input 116 into output AC power and provide the output AC power to the output 114. In certain examples, the power conversion stage 110 includes a DC/DC converter configured to convert the backup DC power from a first voltage level to a second voltage level before the DC power is converted into the output AC power.

Figure 2A:
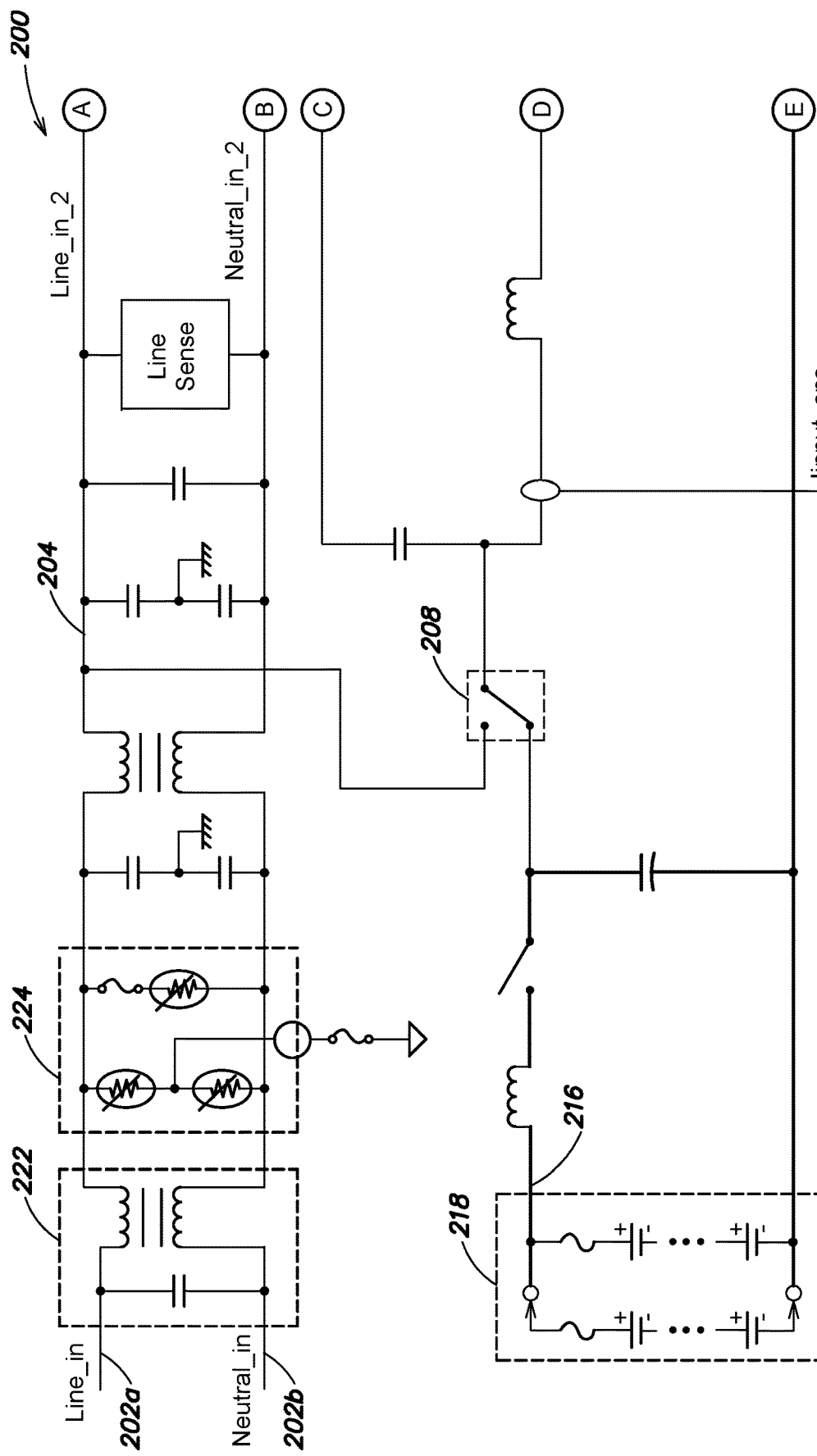
FIGS. 2A and 2B illustrate a schematic diagram of a UPS in accordance with aspects described herein.
Figure 2B:
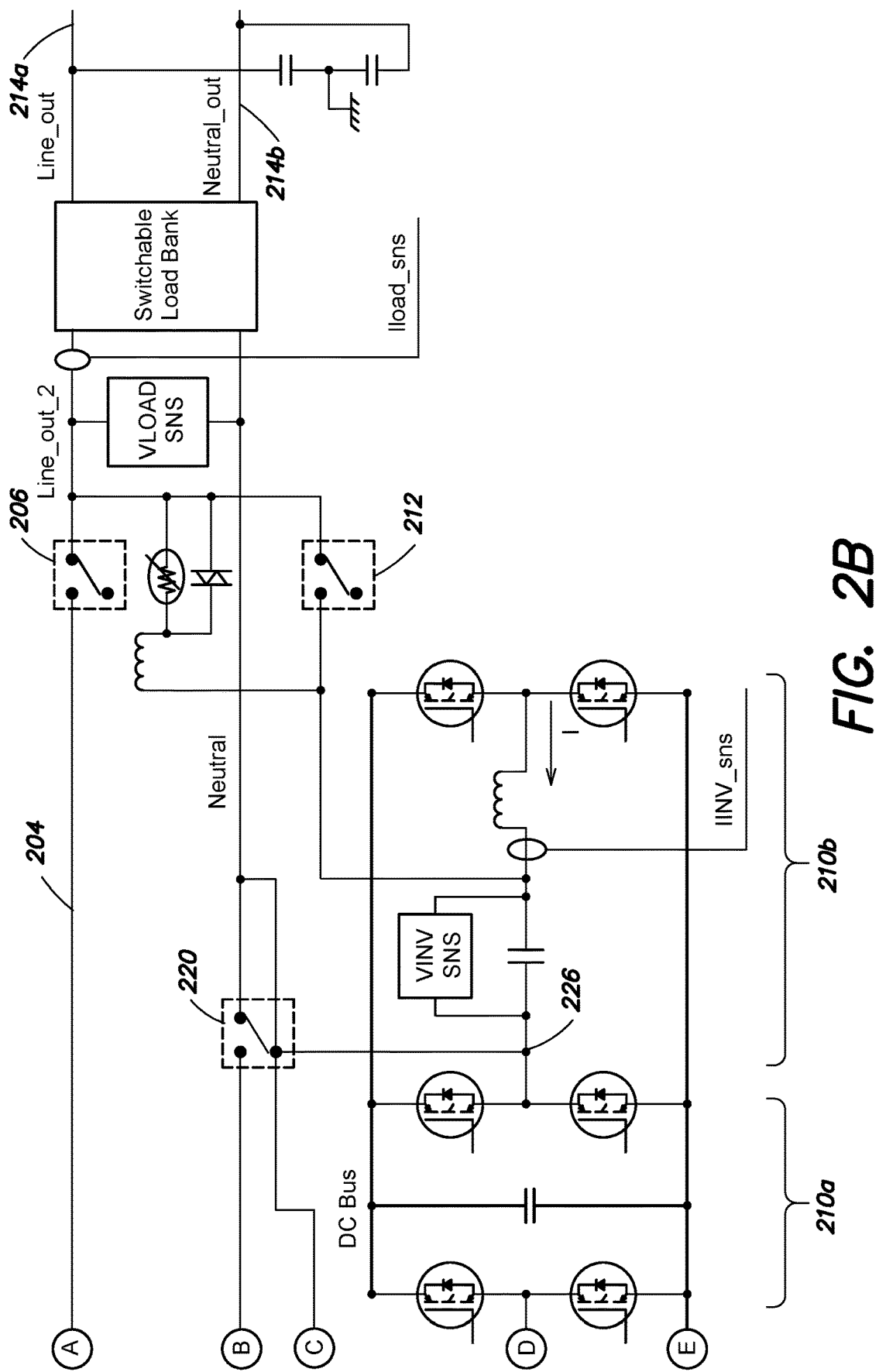

FIGS. 2A and 2B illustrate a schematic diagram of one embodiment of an online UPS 200. In one example, the UPS 200 corresponds to the UPS 100 of FIG. 1. The UPS 200 includes an input 202, a bypass line 204, a bypass relay 206, an input relay 208, a power conversion stage 210, an inverter relay 212, an output 214, and a backup power input 216.

In some examples, the input 202 includes a line input 202a and a neutral input 202b and the output 214 includes a line output 214a and a neutral output 214b. The power conversion stage 210 includes a PFC converter stage 210a and an inverter stage 210b. The backup power input 216 is configured to receive backup DC power from a battery 218. In one example, the UPS 200 includes the battery 218; however, in other examples the battery 218 may be external to the UPS 200. In certain examples, the UPS 200 also includes a backfeed relay 220 coupled between the neutral input 202b and the neutral output 214b.

In some examples, the UPS 200 includes a filter 222 and a plurality of metal oxide varistors (MOVs) 224. In one example, the filter 222 is configured as an electromagnetic interference (EMI) filter and is capable of stopping and/or absorbing short duration transients at the input 202. Likewise, the plurality of MOVs 224 may be configured to clamp high voltage transients at the input 202 (e.g., to ground/neutral via a fuse).

Similar to the UPS 100 described above, the UPS 200 is generally configured to operate in one of at least three modes of operation, including a bypass mode, a line mode, and a backup mode. The mode of operation of the UPS 200 is dependent upon a quality level of AC power received at the input 202 (for example, from a utility mains AC power supply).

When the AC power received at the input 202 is available and acceptable (i.e., within a specified range of acceptable electrical parameters), the UPS 200 is configured to operate in the bypass mode. In the bypass mode, the bypass relay 206 is turned on (i.e., closed) to connect the input 202 to the output 214. The input 202 receives AC power and provides the received power to the output 214. The output 214 receives the power from the input 202 and provides the power to an external load (not shown). In the bypass mode, the input relay 208 is controlled to couple the PFC converter stage 210a of the power conversion stage 210 to the input 202 and the inverter relay 212 may be turned off (i.e., opened) to decouple the power conversion stage 210 from the output 214. In addition, the backfeed relay 220 is turned on (i.e., closed) during the bypass mode to couple the neutral input 202b to the neutral output 214b.

When the AC power received at the input 202 is available but unacceptable (i.e., not within a specified range of acceptable electrical parameters), the UPS 200 is configured to operate in the line mode. In the line mode, the bypass relay 206 is turned off (i.e., opened), and the input AC power is not provided to the output 214. The input relay 208 is controlled to couple the input 202 to the PFC converter stage 210a of the power conversion stage 210 and the inverter relay 212 is turned on (i.e., closed) to couple the inverter stage 210b of the power conversion stage 210 to the output 214. The power conversion stage 210 converts the input AC power into output AC power and provides the output AC power to the output 114. In one example, the PFC converter stage 210a is configured to convert the input AC power into DC power and the inverter stage 210b is configured to convert the DC power into the output AC power. In addition, the backfeed relay 220 is turned on (i.e., closed) during the line mode to couple the neutral connection 226 of the power conversion stage 210 to the neutral input 202b.

When AC power at the input 102 is unavailable (e.g., blackout, grid failure, etc.), the UPS 200 is configured to operate in the backup mode. In the backup mode, the bypass relay 206 is turned off (i.e., opened), the inverter relay 212 is turned on (i.e., closed), and the input relay 208 is controlled to couple the backup power input 216 to the power conversion stage 210. In addition, the backfeed relay 220 is turned off (i.e., opened) during the backup mode to decouple the neutral connection 226 of the power conversion stage 210 from the neutral input 202b. In one example, the inverter stage 210b of the power conversion stage 210 is configured to convert the backup DC power received at the backup power input 216 into output AC power and provide the output AC power to the output 214. In certain examples, the power conversion stage 210 is operated such that the backup DC power bypasses the PFC converter stage 210a. In other examples, the PFC converter stage 210a is operated to convert the backup DC power from a first voltage level to a second voltage level before the DC power is converted into the output AC power (via the inverter stage 210b).

As described above, in the bypass and line modes of operation, the input relay 208 is controlled to couple the line input 202a to the power conversion stage 210 and the backfeed relay 220 is turned on (i.e., closed) to couple the neutral connection 226 of the power conversion stage 210 to the neutral input 202b. In addition, in the bypass mode of operation, the bypass relay 206 is turned on (i.e., closed) to couple the line input 202a to the line output 214a. As such, when transitioning from either the bypass or line mode of operation to the backup mode of operation, the input relay 208 is controlled to couple the backup power input 216 to the power conversion stage 210, the backfeed relay 220 is turned off (i.e., opened) to decouple the neutral connection 226 of the power conversion stage 210 from the neutral input 202b, and the bypass relay 206 is turned off (i.e., opened) to decouple the line input 202a from the line output 214a.

In some cases, the UPS 200 is configured to transition to the backup mode of operation in response to an AC swell or overvoltage condition at the input 202. However, the input relay 208, the backfeed relay 220, and/or the bypass relay 206 may not be capable of reacting (i.e., changing states) fast enough to prevent inrush current or hazardous voltages from reaching the load, the converter 210, or other components of the UPS 200. For example, in order to prevent arcing across the contacts of the relays, each of the relays may be transitioned (e.g., opened) at or around zero crossings of the input AC power. As such, it can take up to a half cycle of the input AC power for one or more of the relays to transition states.

In some examples, inrush currents from AC swell and overvoltage conditions can reach high levels (e.g., up to 380 A), exceeding the operational ratings of devices/components included in the UPS 200. In certain examples, even if individual devices/components are turned off or deactivated in anticipation of such inrush currents, passive components (e.g., free-wheeling diodes) can provide additional conduction paths for inrush currents. In such cases, the devices/components of the UPS 200 may be exposed to potentially damaging conditions and the UPS 200 may fail. In addition, exposure to such conditions may cause damage to the load.

As described above, the UPS 200 may include the filter 222 and the plurality of MOVs 224 to protect devices/components of the UPS 200 from short duration and high voltage transients. However, the voltages/currents corresponding to the AC swell and overvoltage conditions may have frequencies similar to the normal input AC power. As such, the filter 222 may be unable to filter out the AC swell or overvoltage condition. Likewise, the voltage level of the AC swell and overvoltage condition may not be high enough to trigger protection via the plurality of MOVs 224. As such, common protection circuitry, such as filters and MOVs, may be inadequate for protection of the UPS 200 during AC swell and overvoltage conditions.

An improved UPS topology and control method is provided herein. In at least one embodiment, the topology includes a crowbar circuit coupled to the input of the UPS. In one example, the control method includes activating the crowbar circuit to divert input power away from the load in response to the detection of a high-voltage condition at the input. In some examples, the crowbar circuit is deactivated in response to a determination that at least one relay of the UPS has transitioned from a first state to a second state.

Figure 3:
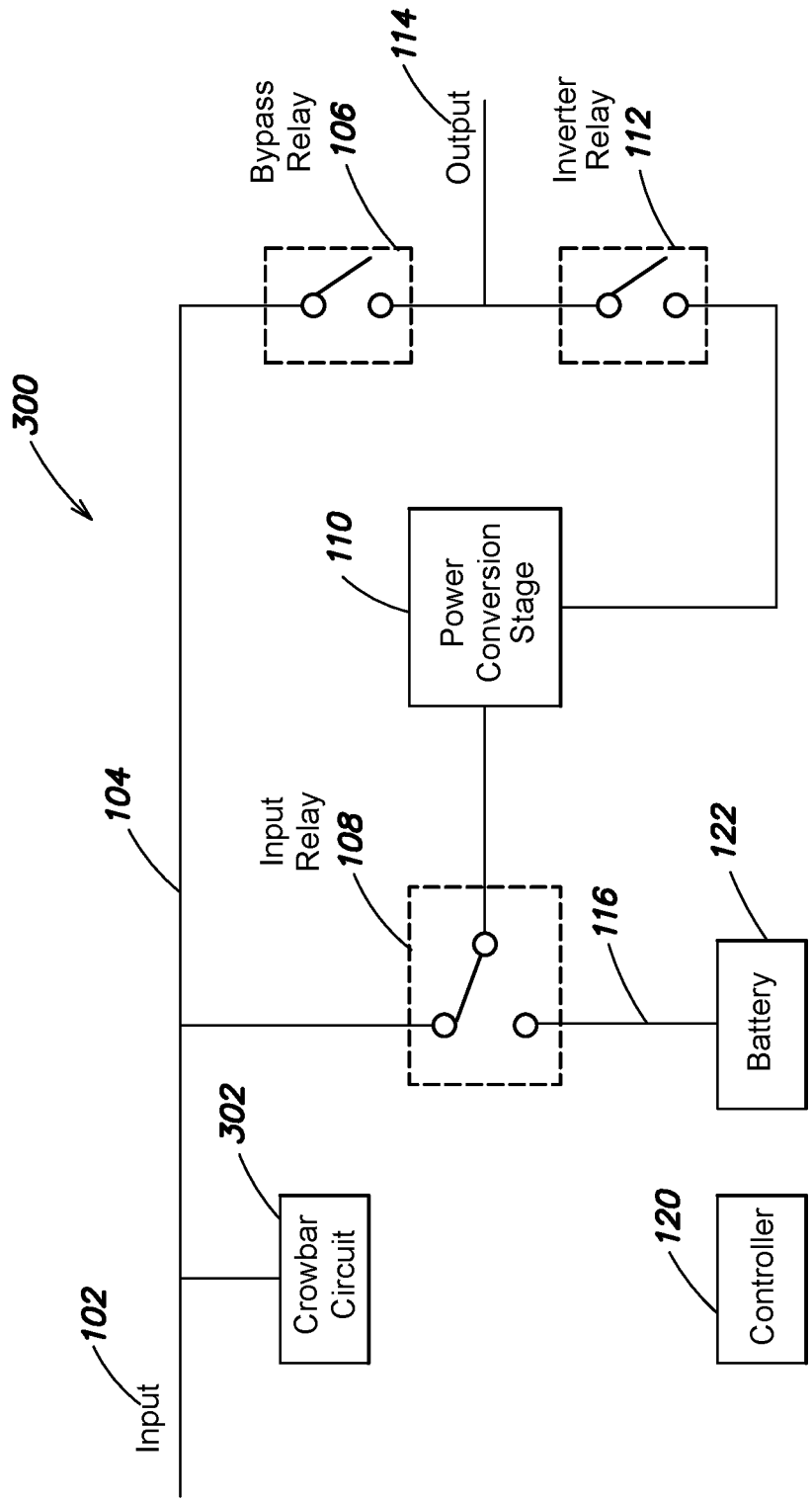
FIG. 3 is a functional block diagram of a UPS including a crowbar circuit in accordance with aspects described herein.

FIG. 3 is a block diagram of an online UPS 300 in accordance with aspects described herein. In one example, the UPS 300 is similar to the UPS 100 of FIG. 1, except the UPS 300 includes a crowbar circuit 302 coupled to the input 102. As shown, the crowbar circuit 302 may be positioned between the input 102 and the input relay 108.

Figure 4:
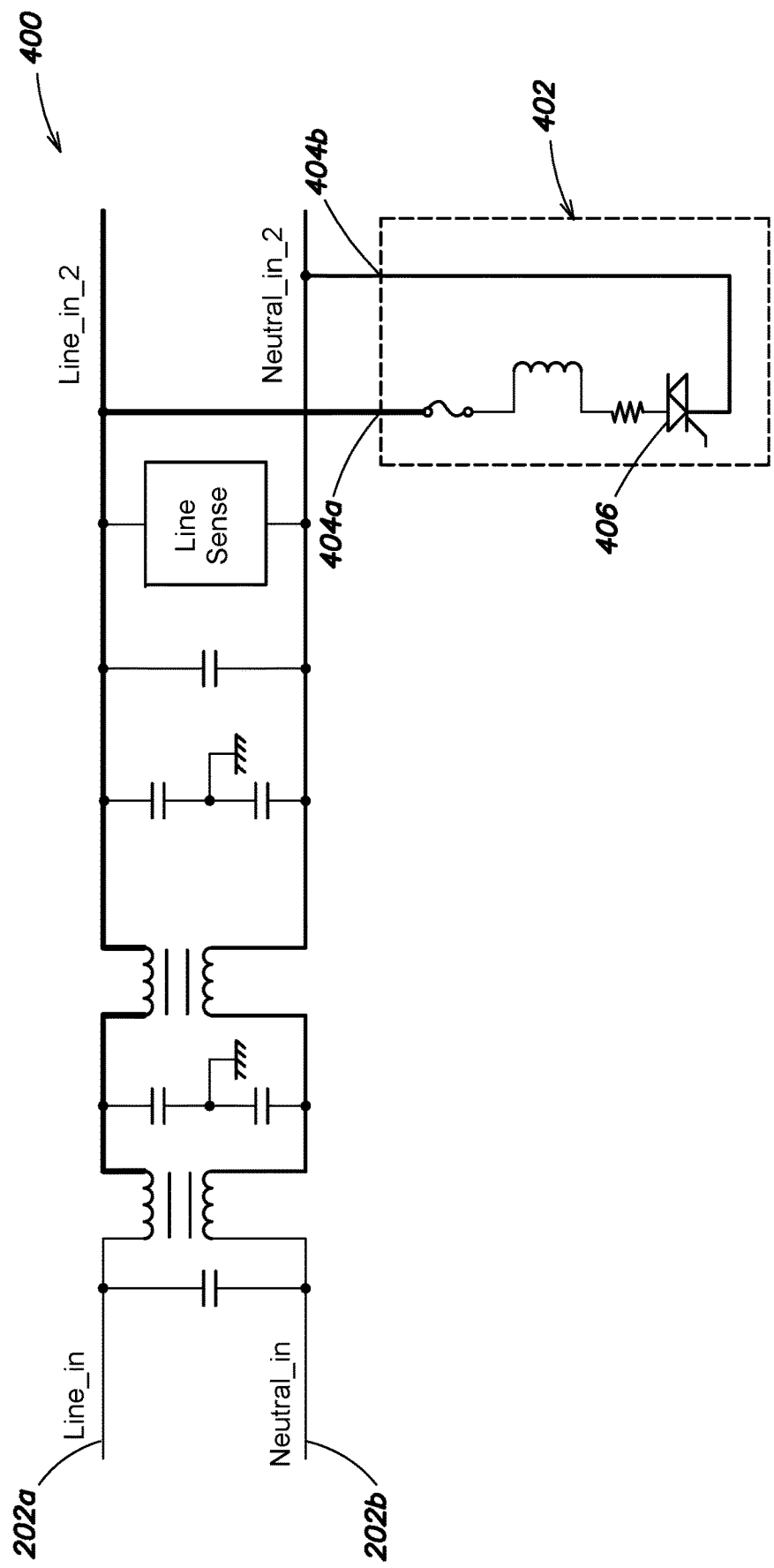
FIG. 4 is a schematic diagram of a UPS including a crowbar circuit in accordance with aspects described herein.

FIG. 4 is a schematic diagram illustrating an input portion of an online UPS 400 in accordance with aspects described herein. In one example, the UPS 400 may be similar to an input portion of the UPS 200 of FIGS. 2A and 2B, except the UPS 400 includes a crowbar circuit 402 coupled to the input 202. While not shown, the crowbar circuit 402 may be positioned between the input 202 and the input relay 208. In one example, the crowbar circuit 402 includes an input 404a coupled to the line input 202a and an output 404b coupled to the neutral input 202b. In certain examples, the crowbar circuit 402 is coupled to the line input 202a and the output 404b through additional circuitry (e.g., a filter stage).

In some examples, the crowbar circuit 402 includes a triac 406. In this context, "triac" corresponds to a three terminal electronic component that conducts current in either direction when triggered or activated. As such, the crowbar circuit 402 may be "activated" by activating or turning on the triac 406. Likewise, the crowbar circuit 402 may be "deactivated" by deactivating or turning off the triac 406. In one example, the triac 406 includes two silicon controlled rectifiers (SCR) coupled together to provide a higher pulsed current rating.

As shown, the crowbar circuit 402 can be activated to couple (or shunt) the line input 202a to the neutral input 202b. Similarly, the crowbar circuit 402 can be deactivated to decouple the line input 202a from the neutral input 202b. In one example, a controller (e.g., controller 120) is configured to send a control signal to the triac 406 to operate the crowbar circuit 402.

In some examples, the controller 120 is configured to send the control signal to activate the crowbar circuit 402 whenever the input relay 208 is commanded to decouple the power conversion stage 210 from the line input 202a and couple the power conversion stage 210 to the backup power input 216. In certain examples, a comparator circuit can be used to compare one or more voltage levels of the UPS 400 (e.g., DC bus of the power conversion stage 210) with the instantaneous voltage of the AC input. In such examples, the controller 120 can be configured to activate the crowbar circuit 402 whenever the instantaneous voltage of the AC input is detected as being higher than the one or more comparison voltages of the UPS 400. In other examples, the controller 120 is configured to monitor the input 202 in order to determine when to activate/deactivate the crowbar circuit 402.

Figure 5:
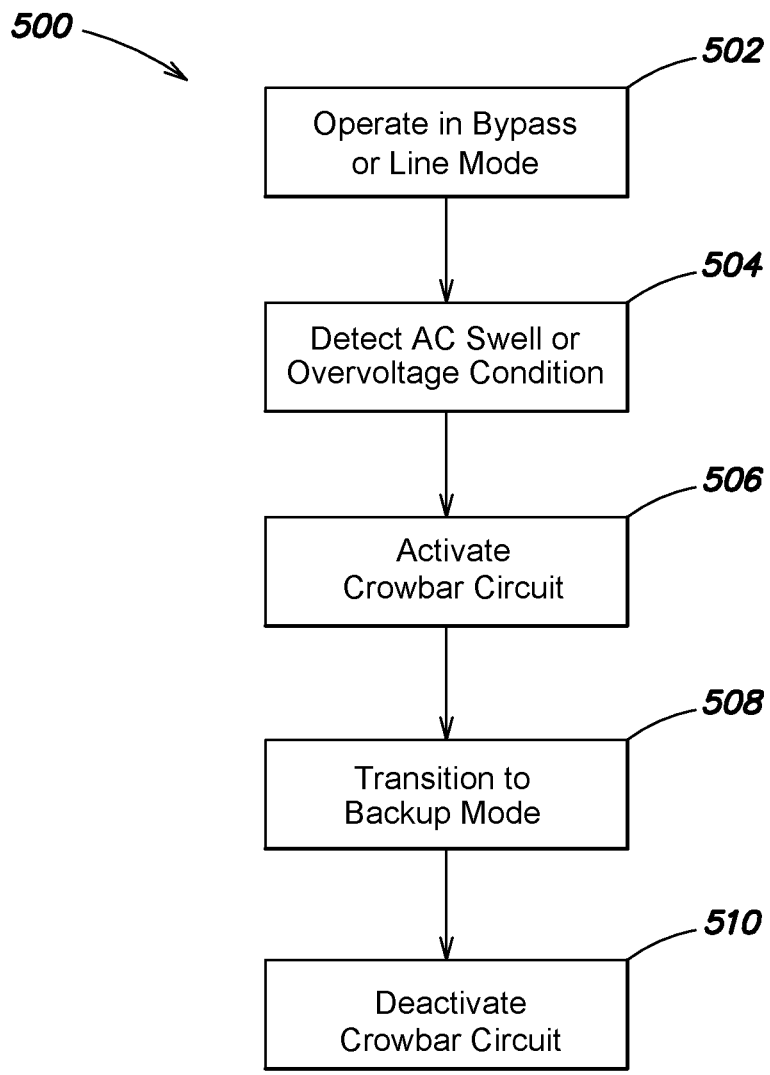
FIG. 5 is a flow chart diagram of a control method of a UPS in accordance with aspects described herein.

FIG. 5 is a flow chart illustrating a control method 500 in accordance with aspects described herein. In one example, the control method 500 corresponds to operation of the UPS 400 of FIG. 4.

At block 502, in response to AC power being available at the input 202, the controller 120 operates the UPS 400 in either the bypass mode of operation or the line mode of operation. At block 504, the controller 120 monitors the input 202 to detect AC swell or overvoltage conditions.

At block 506, in response to the detection of an AC swell or overvoltage condition, the controller 120 activates the crowbar circuit 402 to divert the input AC power away from the load coupled to the output 214. In some examples, the activated crowbar circuit 402 is configured to divert at least a portion of an inrush current associated with the AC swell or overvoltage condition away from the load, as well as components/devices of the UPS 400.

In one example, the controller 120 outputs a signal to activate the crowbar circuit 402 (i.e., triac 406) such that the line input 202*a* is shunted to the neutral input 202*b*. In some examples, the controller 120 is configured to trigger the triac 406 using a single gating pulse having a predetermined pulse width (e.g., less than 1 millisecond).

At block 508, the controller 120 operates the UPS 400 to transition to the backup mode of operation. As described above, during a transition from the bypass and line modes of operation to the backup mode of operation, at least one relay of the UPS 400 is controlled to transition from a first state to a second state. For example, the input relay 208 is controlled to decouple the line input 202*a* from the power conversion stage 210 and to couple the backup power input 216 to the power conversion stage 210. Similarly, the backfeed relay 220 is turned off (i.e., opened) to decouple the neutral connection 226 of the power conversion stage 210 from the neutral input 202*b*. Likewise, if transitioning from the bypass mode of operation, the bypass relay 206 is turned off (i.e., opened) to decouple the line input 202*a* from the line output 214*a*.

In one example, the crowbar circuit 402 is activated (block 506) at substantially the same time that the controller 120 operates the UPS 400 to transition to the backup mode of operation (block 508). In other examples, the crowbar circuit 402 can be activated before the UPS 400 is operated to transition to the backup mode of operation. By activating the crowbar circuit 402 in response to the detection of an AC swell or overvoltage condition, devices/components of the UPS 400 can be protected from the inrush current associated with the AC swell or overvoltage condition while the UPS 400 is transitioned to the backup mode of operation. As such, the load and devices/components of the UPS 400 can be protected from potentially harmful inrush currents and hazardous voltages before the relays of the UPS 400 are safely transitioned (e.g., at zero crossings).

At block 510, in response to a determination that the UPS 400 has transitioned to the backup mode of operation, the controller 120 deactivates the crowbar circuit 402 to decouple the line input 202*a* from the neutral input 202*b*. In one example, determining that the UPS 400 has successfully transitioned to the backup mode of operation includes waiting for a predetermined period of time. For example, the controller 120 may be configured to wait for a predetermined amount of time corresponding to the transition time of at least one relay included in the UPS 400. In other examples, the controller 120 monitors one or more of the relays to determine when the UPS 400 has successfully transitioned to the backup mode of operation.

In some examples, the crowbar circuit 402 is automatically deactivated based on the control signal provided by the controller 120. For example, as described above, the controller 120 may provide a single gating pulse having a predetermined pulse width to activate the crowbar circuit 402 (block 506). In certain examples, the predetermined pulse width corresponds to a transition time of the UPS 400 (e.g., relay transition time). As such, when the single gating pulse expires, the crowbar circuit 402 is returned to the deactivated state.

Once the crowbar circuit 402 has been deactivated, the controller 120 may continue to monitor the input 202 to determine when the AC swell or overvoltage condition has transpired. In some examples, in response to determining that the AC swell or overvoltage condition has transpired, the controller 120 operates the UPS 400 to transition back to either the bypass mode of operation or the line mode of operation.

Figure 6:
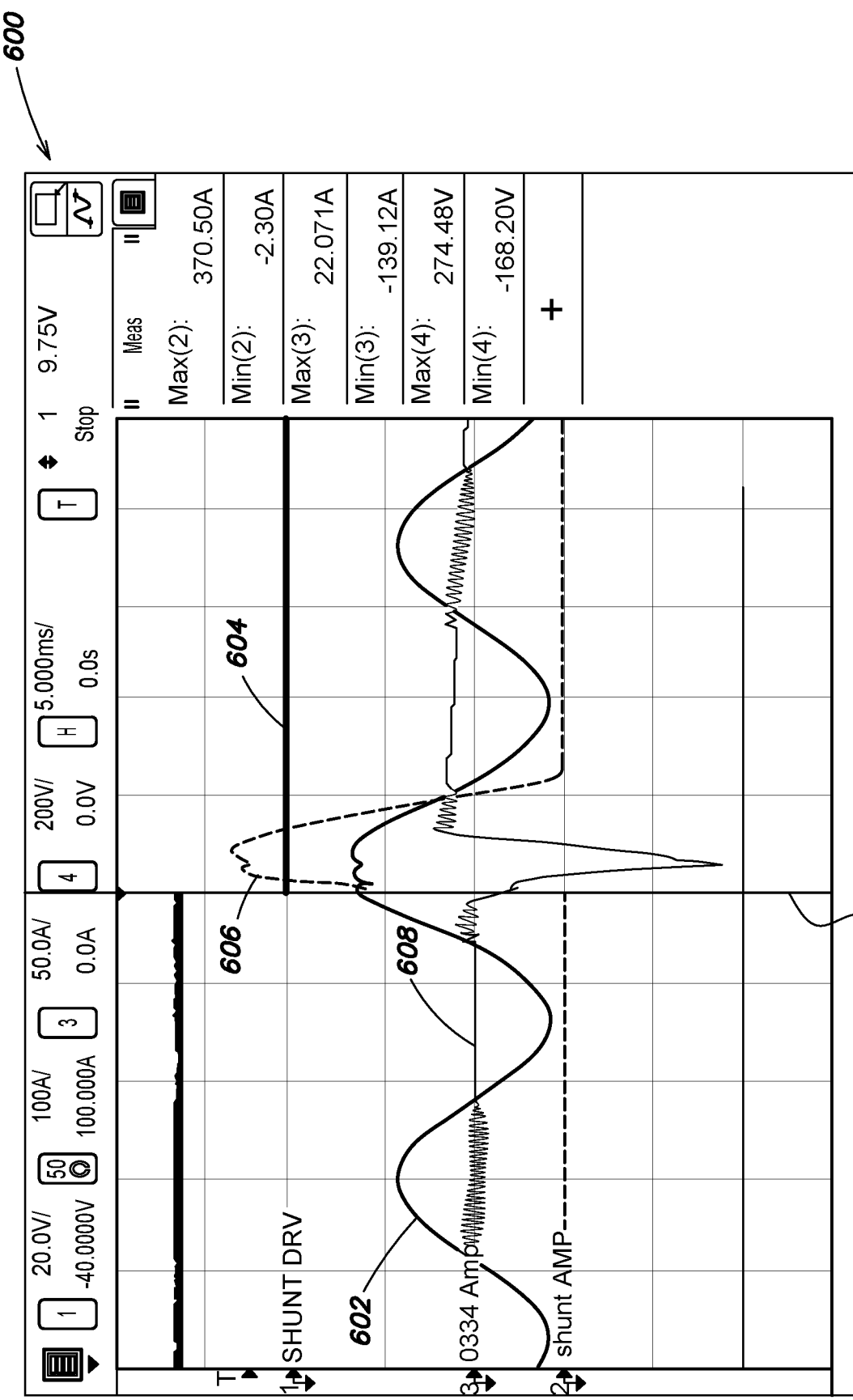
FIG. 6 is a graph of various waveforms associated with the operation of a UPS in accordance with aspects described herein.

FIG. 6 is a graph 600 illustrating various waveforms corresponding to operation of the UPS 400 in accordance with aspects described herein. The graph 600 includes an input AC voltage 602, a control signal 604, a first current 606, and a second current 608. In one example, the control signal 604 corresponds to the control signal used to operate the input relay 208, the first current 606 represents current shunted through the crowbar circuit 402, and the second current 608 represents current provided to the converter 210. In the illustrated example, when the control signal 604 is low (e.g. '0'), the input relay 208 is controlled to decouple the line input 202*a* from the power conversion stage 210 and to couple the backup power input 216 to the power conversion stage 210.

At time 610, in response to a high voltage condition (i.e., AC swell, overvoltage, etc.) associated with the input AC voltage 602, the crowbar circuit 402 is activated via a gating pulse (not shown). Once the crowbar circuit 402 is activated, a majority of the inrush current corresponding to the high voltage condition is shunted through the crowbar circuit 402 (shown as the first current 606). As a result, the peak current through the power conversion stage 210 during the high voltage condition is reduced to a safe, acceptable level (shown as the second current 608). For example, during a high voltage condition, the crowbar circuit 402 may shunt a 370 A current while the current provided to the power conversion stage 210 is reduced to 140 A. In some examples, the crowbar circuit 402 remains activated until the gating pulse expires (e.g., after 1 millisecond). In certain examples, after expiration of the gating pulse, the crowbar circuit 402 is configured to be deactivated at the next zero-crossing of the input AC voltage.

Figure 7:
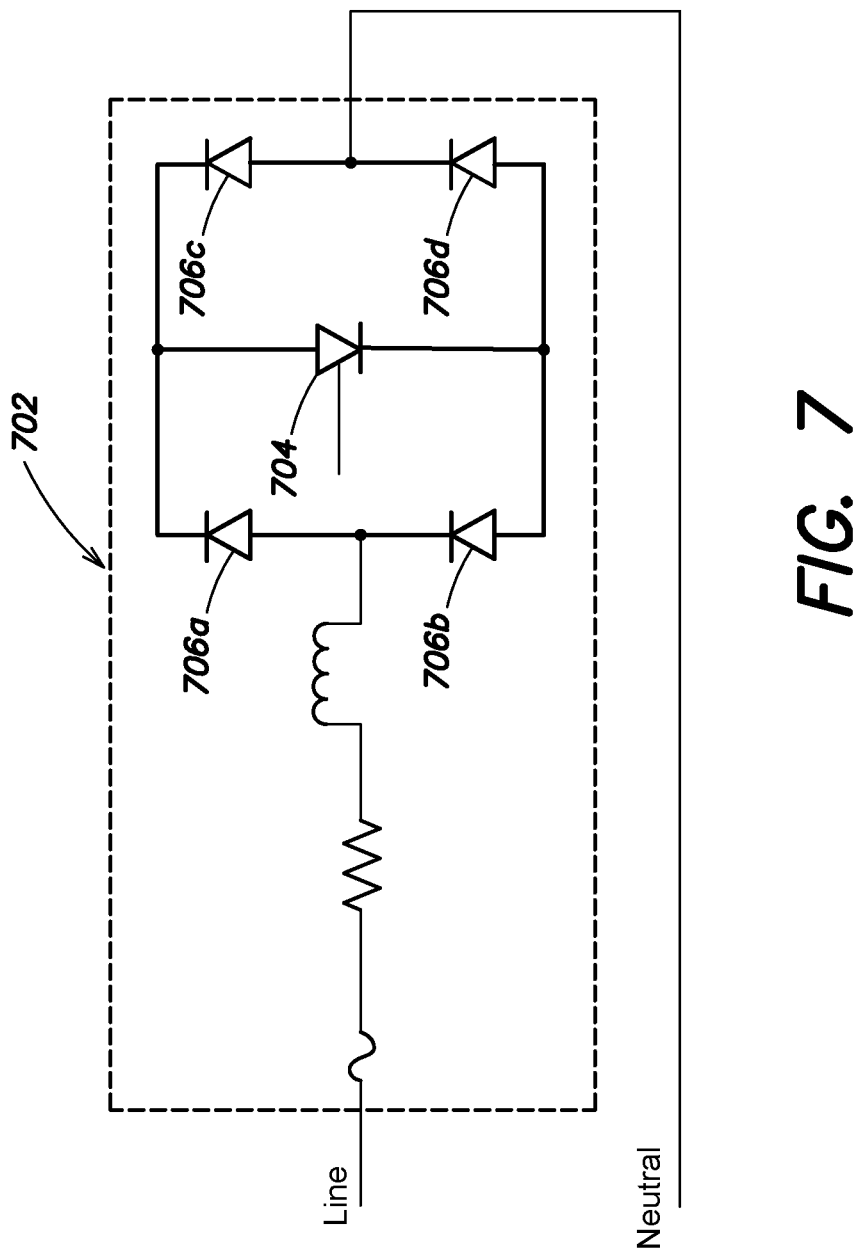
FIG. 7 is a schematic diagram of a crowbar circuit in accordance with aspects described herein.

FIG. 7 is a schematic diagram illustrating a crowbar circuit 702 in accordance with aspects described herein. In one example, the crowbar circuit 702 is included in the UPS 400 of FIG. 4, similar to the crowbar circuit 402. The crowbar circuit 702 includes an SCR 704 and a full-bridge diode circuit (i.e., diodes 706*a*-706*d*). In some examples, the crowbar circuit 702 can provide a high pulse current rating similar to the crowbar circuit 402 (or higher) while including only a single SCR, improving design flexibility and potential cost savings.

As described above, an improved UPS topology and control method is provided herein. In at least one embodiment, the topology includes a crowbar circuit coupled to the input of the UPS. In one example, the control method includes activating the crowbar circuit to divert input power away from a load in response to the detection of a high-voltage condition at the input. In some examples, the crowbar circuit is deactivated in response to a determination that at least one relay of the UPS has transitioned from a first state to a second state.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A power supply, the power supply comprising:
  an input configured to receive AC input power having an input AC voltage;

an output configured to provide output power to a load;
at least one relay coupled to the input and the output;
a crowbar circuit including at least one switching device configured to selectively divert the input power away from the load; and
a controller configured to:
  detect a high-voltage condition at the input;
  activate, in response to detecting the high-voltage condition at the input, the at least one switching device of the crowbar circuit to shunt the input power away from the at least one relay and the load through the at least one switching device;
  output, in response to detecting the high-voltage condition at the input, a signal to operate the at least one relay to transition from a first state to a second state to decouple the input from the output; and
  deactivate the at least one switching device of the crowbar circuit in response to a determination that the at least one relay has transitioned to the second state and that the input AC voltage is at a zero-crossing.

2. The power supply of claim 1, wherein the controller is further configured to:
provide, in response to deactivating the at least one switching device of the crowbar circuit, the output power to the load from the power supply.

3. The power supply of claim 1, wherein the controller is further configured to output the signal to operate the at least one relay to transition from the first state to the second state while simultaneously activating the at least one switching device of the crowbar circuit.

4. The power supply of claim 1, wherein the controller is further configured to:
determine that the high-voltage condition at the input has ended; and
output, in response to determining that the high-voltage condition at the input has ended, a signal to transition the at least one relay from the second state to the first state.

5. The power supply of claim 1, wherein determining that the at least one relay has transitioned to the second state includes waiting for a predetermined amount of time to elapse after outputting the signal to operate the at least one relay to transition from the first state to the second state.

6. The power supply of claim 5, wherein the predetermined amount of time corresponds to a transition time of the at least one relay.

7. The power supply of claim 1, wherein the at least one relay is coupled between the input and the output.

8. The power supply of claim 1, further comprising a power converter coupled between the input and the output, wherein the at least one relay is coupled between the input and the power converter.

9. The power supply of claim 1, wherein diverting the input power away from the load includes shunting at least a portion of a current associated with the high-voltage condition to a neutral connection.

10. An Uninterruptible Power Supply (UPS), the UPS comprising:
an input configured to receive input AC power having an input AC voltage;
an output configured to provide output AC power to a load;
at least one relay coupled to the input and the output;
a crowbar circuit including at least one switching device coupled to the input and configured to selectively divert the input AC power away from the load; and
a controller configured to:
  monitor the input AC power;
  operate, in response to a determination that the input AC power is acceptable, the UPS in a first mode of operation;
  detect a high-voltage condition at the input;
  activate, in response to the high-voltage condition at the input, the at least one switching device of the crowbar circuit to shunt the input power away from the load and the at least one relay through the at least one switching device;
  output, in response to the high-voltage condition at the input, a signal to operate the at least one relay to transition from a first state to a second state;
  operate, in response to a determination that the at least one relay has transitioned to the second state, the UPS in a second mode of operation to decouple the input from the output; and
  deactivate the at least one switching device of the crowbar circuit in response to a determination that the at least one relay has transitioned to the second state and that the input AC voltage is at a zero-crossing.

11. The UPS of claim 10, further comprising:
a backup power input configured to receive backup DC power from a backup power source; and
a converter configured to convert the input AC power from the input and the backup DC power from the backup power input into the output AC power.

12. The UPS of claim 11, wherein the at least one relay includes at least one of an input relay configured to selectively couple the converter to the input and the backup power input, a bypass relay coupled between the input and the load, or a backfeed relay coupled between the neutral connection and the load.

13. The UPS of claim 11, wherein the crowbar circuit is configured to divert the input power away from the load by coupling the input to a neutral connection for a duration equal to or greater than a transition time of the at least one relay.

14. The UPS of claim 13, wherein at least a portion of a current associated with the high-voltage condition is shunted to the neutral connection while the crowbar circuit is activated.

15. The UPS of claim 10, wherein the first mode of operation corresponds to one of a bypass mode of operation or a line mode of operation and the second mode of operation corresponds to a backup mode of operation.

16. A non-transitory computer-readable medium storing thereon sequences of computer-executable instructions for controlling a power supply including an input configured to receive AC input power having an AC input voltage and an output configured to provide output power to a load, the sequences of computer-executable instructions including instructions that instruct at least one processor to:
detect a high-voltage condition at the input;
activate, in response to detecting the high-voltage condition at the input, at least one switching device of a crowbar circuit to shunt the input power away from at least one relay and the load through the at least one switching device;
output, in response to detecting the high-voltage condition at the input, a signal to operate the at least one relay to transition from a first state to a second state to decouple the input from the output; and
deactivate the at least one switching device of the crowbar circuit in response to a determination that the at least one relay has transitioned to the second state and that the AC input voltage is at a zero-crossing.

17. The non-transitory computer readable medium according to claim 16, wherein the sequences of instructions include instructions that instruct the at least one processor to:
output the signal to operate the at least one relay to transition from the first state to the second state while simultaneously activating the at least one switching device of the crowbar circuit.

18. The non-transitory computer readable medium according to claim 16, wherein the sequences of instructions include instructions that instruct the at least one processor to:
determine that the high-voltage condition at the input has ended; and
output, in response to determining that the high-voltage condition at the input has ended, a signal to transition the at least one relay from the second state to the first state.

19. The non-transitory computer readable medium according to claim 16, wherein the sequences of instructions include instructions that instruct the at least one processor to:
determine that the at least one relay has transitioned to the second state by waiting for a predetermined amount of time to elapse after outputting the signal to operate the at least one relay to transition from the first state to the second state.

20. The non-transitory computer readable medium according to claim 19, wherein the predetermined amount of time corresponds to a transition time of the at least one relay.

* * * * *